(12) United States Patent
Mayster et al.

(10) Patent No.: US 12,159,360 B2
(45) Date of Patent: Dec. 3, 2024

(54) DISCOVERY, MANAGEMENT AND PROCESSING OF VIRTUAL REAL ESTATE CONTENT

(71) Applicant: Google LLC, Mountain View, CA (US)

(72) Inventors: Yan Mayster, Aurora, CO (US); Bruce Bahnsen, Boulder, CO (US); Zhiyuan Weng, Erie, CO (US)

(73) Assignee: Google LLC, Mountain View, CA (US)

( * ) Notice: Subject to any disclaimer, the term of this patent is extended or adjusted under 35 U.S.C. 154(b) by 60 days.

(21) Appl. No.: 17/429,884

(22) PCT Filed: Aug. 10, 2020

(86) PCT No.: PCT/US2020/045627
§ 371 (c)(1),
(2) Date: Aug. 10, 2021

(87) PCT Pub. No.: WO2022/035418
PCT Pub. Date: Feb. 17, 2022

(65) Prior Publication Data
US 2022/0198771 A1 Jun. 23, 2022

(51) Int. Cl.
*G06T 19/20* (2011.01)
*G06T 17/05* (2011.01)

(52) U.S. Cl.
CPC .............. *G06T 19/20* (2013.01); *G06T 17/05* (2013.01); *G06T 2200/24* (2013.01); *G06T 2219/024* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 10,699,488 B1 | 6/2020 | Terrano | |
| 2014/0313225 A1 | 10/2014 | Lee et al. | |
| 2016/0240011 A1* | 8/2016 | Fedosov | G01C 21/3638 |
| 2018/0082123 A1* | 3/2018 | Katz | G06Q 30/0273 |
| 2018/0323972 A1* | 11/2018 | Reed | G06F 3/013 |
| 2019/0057551 A1* | 2/2019 | Mathwig | G06F 3/011 |

OTHER PUBLICATIONS

International Search Report and Written Opinion for International Application No. PCT/US2020/045627 dated Apr. 20, 2021. 14 pages.

* cited by examiner

*Primary Examiner* — Kent W Chang
*Assistant Examiner* — Jonathan M Cofino
(74) *Attorney, Agent, or Firm* — Lerner David LLP

(57) ABSTRACT

Virtual spaces can be added to both 2D and 3D representations of physical spaces allowing for enhancements of those spaces. The virtual spaces can belong to business locations, such as a bakery or coffee shop, and content for those spaces can be controlled by the owner or user of that location. Virtual spaces belonging to public spaces can be provided as digital space for content providers. Valuation of the virtual space can occur based on various requests and use metrics of that virtual space and provide a marketplace for the addition of virtual content. Layers or groups of virtual spaces can be created and enabled or disabled by a user viewing the representation with the virtual space.

17 Claims, 8 Drawing Sheets

200

240

250

Method 400

DISCOVERY, MANAGEMENT AND PROCESSING OF VIRTUAL REAL ESTATE CONTENT

The present application is a national phase entry under 35 U.S.C. § 371 of International Application No. PCT/US2020/045627 filed Aug. 10, 2020, entitled Discovery, Management And Processing Of Virtual Real Estate Content, the entire disclosure of which is incorporated herein by reference.

BACKGROUND

Interactive three-dimensional (3D or 3-D) representations of physical environments can be presented to users to enable users to obtain a perspective of an environment as if the user was at or near that physical environment. A common use of such a representation is to create a representation of a physical environment which is near a known GPS location or address. The 3D representation can be interacted with by a user, such as, responsive to user input by allowing the user to rotate, change viewing angle, zoom in or out, or to "travel" or "move" to different parts of the representation or a portion of the representation. For instance, the representation may be one from a street perspective in which a user can move down a street, and zoom into a particular building on this street.

The representation can be based on a created model of the environment. The aforementioned representations are typically based on static images which have been integrated into a model of a physical environment. For instance, the model may have been generated from static images of a location captured with cameras at a particular time. Although the representation may be loosely associated with some information, such as an address or a GPS location, the representation or model is itself static as it is based on information or source data which is not updated. In addition, aspects of the model, which may be easily identifiable by a human, usually cannot be easily integrated into the model during the creation of the model from underlying information. Such examples include for example, areas such as a storefront, a wall, a window, a billboard, or other "object," which are not inherently identified within the model. In addition, the 3D model typically is not changeable to reflect live updates related to the environment.

SUMMARY

Aspects of the present disclosure include methods, systems, and apparatuses for displaying dynamic or interactive content within a 2D, 3D, or other representation of a location, physical environment, or area.

Aspects of the present disclosure provide for a method of displaying content in a virtual space, the method comprising, providing to a user an interface for uploading content for display in one or more virtual spaces; displaying a representation of a real world environment; displaying to the user simultaneously with the representation one or more virtual spaces configured to display content; receiving content for display in at least one of the one or more virtual spaces; combining content with the at least one of the one or more virtual spaces, wherein each virtual space is determined based upon at least a characteristic of the real world environment.

Additional aspects of the invention provide for a method of displaying content in a virtual space, the method comprising, providing to a user an interface for uploading content for display in one or more virtual spaces; displaying a representation of a real world environment; displaying to the user simultaneously with the representation one or more virtual spaces configured to display content; receiving content for display in at least one of the one or more virtual spaces; combining the received content with the at least one of the one or more virtual spaces. Each virtual space may be determined based upon at least a characteristic of the real world environment. The characteristics may be one of relative visibility, viewshed, prominence of a space, elevation, unused, unoccupied, or unmarked physical space, proximity to a marker, a store front, or the presence of signage. Each virtual space may be determined by a machine learning algorithm and the machine learning algorithm may comprise analyzing image content. Each virtual space may be determined at least partly by a trained machine learning model, the trained machine learning model having been trained using training data, and the training data comprising a plurality of images each including one or more areas identified as a virtual space. The virtual space may be associated with a confidence metric. One or more users may edit the boundaries of the virtual space. The content provided by one or more users may be interactive. The content provided by one or more users can be configured to send a notification to the one or more users providing the content upon receiving an input or interaction by another user with the content. One or more users may be verified as owners of a physical space associated with the virtual space.

Additional aspects of the invention provide for a system for displaying content in a virtual space. The system can comprise a processor configured to determine a virtual space based upon at least a characteristic of a real world environment; provide, to a user, an interface for uploading content for display in one or more virtual spaces; display to the user, the one or more virtual spaces configured to display content along with a representation of the real world environment; receive, from the user, content for display in at least one of the one or more virtual spaces; and combine the received content with at least one of the one or more virtual spaces. The characteristic may be one of relative visibility, viewshed, prominence of a space, elevation, unused physical space, proximity to a marker, a storefront, or the presence of signage. Each virtual space may be determined by a machine learning algorithm, the machine learning algorithm further comprising analyzing image content. Each virtual space may be determined at least partly by a trained machine learning model, the trained machine learning model having been trained using training data, the training data comprising a plurality of images each including one or more areas identified as a virtual space. The virtual space may be associated with a confidence metric. One or more users may edit the boundaries of the virtual space. The content provided by one or more users may be interactive. The content provided by one or more users can be configured to send a notification to the one or more users providing the content upon receiving an input or interaction by another user with the content. One or more users may be verified as owners of a physical space associated with the virtual space.

Additional aspects of the invention provide for a method of displaying content in a representation of a physical environment, the method comprising any combination of: displaying a representation of a physical environment; displaying simultaneously with the representation a virtual space with content integrated into the virtual space; wherein each virtual space is determined based upon at least a characteristic of the physical environment. The machine learning algorithm or model can reject virtual spaces with a characteristic under or over a predefined parameter. User input can be received with the user input being provided or received through a user interaction with the virtual space. The representation can be displayed on an augmented reality interface. The physical characteristic can be one or more of relative visibility, viewshed, prominence of a space, elevation, unused physical space, proximity to a marker, a storefront, or the presence of signage.

Additional aspects of the invention provide for a method of displaying content in a virtual space, the method comprising any combination of: providing to a first user an interface for uploading content for display in one or more virtual spaces; displaying to the first user a virtual space configured to display content along with a base representation of a physical environment; receiving from the first user content for display in the virtual space; combining the received content with the virtual space wherein each virtual space is determined based upon at least a characteristic of the physical environment; providing to a second user an interface for viewing content displayed in one or more virtual spaces; displaying on the interface and to the second user when the second user is viewing the physical environment simultaneously with the base representation the virtual space with the content integrated into the virtual space.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

Figure 1A:
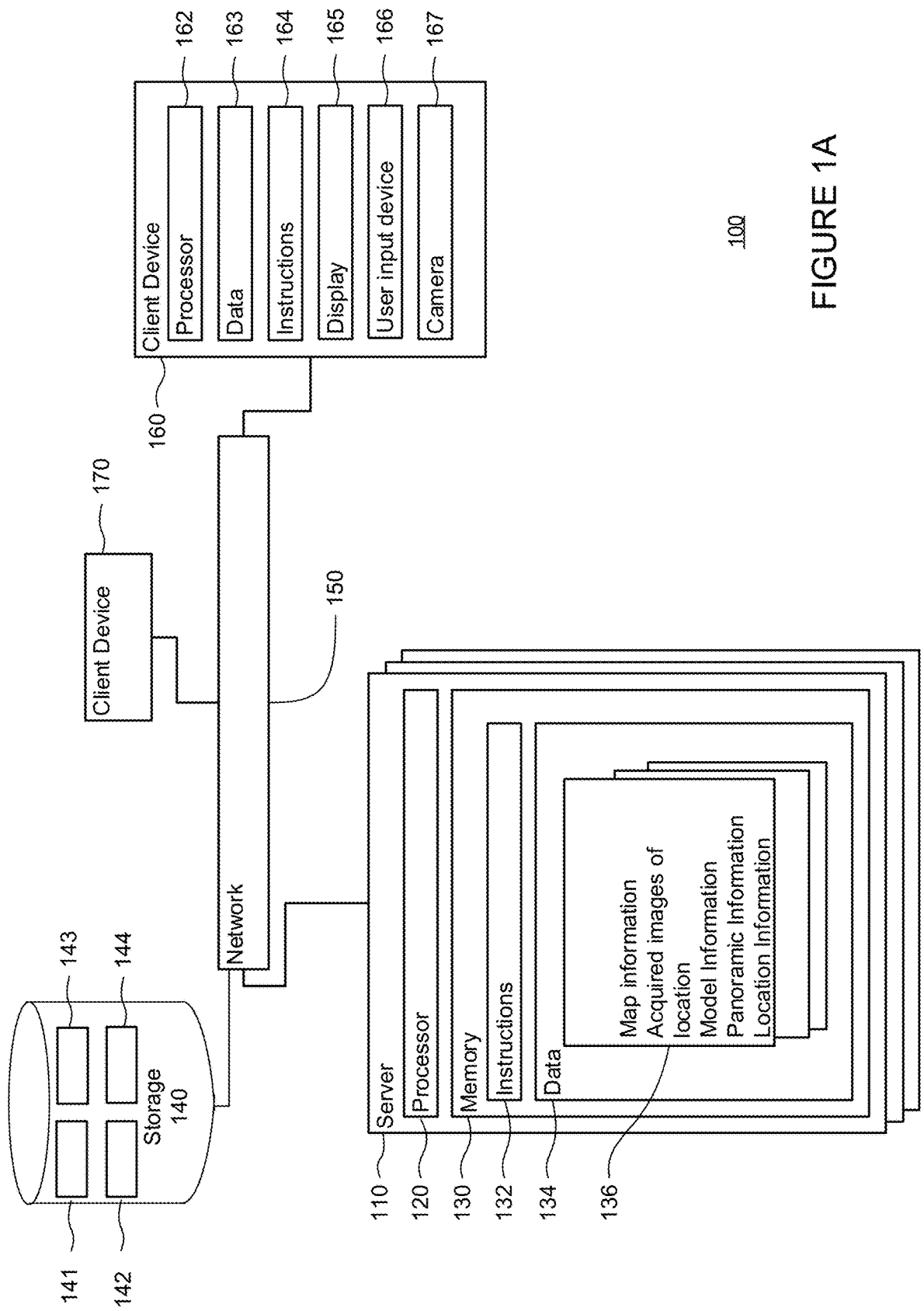
FIG. 1A is a functional diagram of a system in accordance with aspects of the disclosure.

The disclosed technology in one aspect may comprise tools which can be utilized to enable interactive, customizable, or updatable models of environments. In some examples, the models may be two-dimensional (2D or 2-D) or three dimensional (3D or 3-D) models. The 3D model may be considered for instance to comprise aerial or street-level imagery or a map in aspects of the disclosed technology. In yet other examples, the model upon which the disclosed technology is utilized may generally be any representation of a physical location, such as, images, image data, collections of pixels, such as for example satellite imagery, map imagery, drone imagery, or ground-level imagery. More generally, the disclosed technology is applicable to any imagery or visual representation of a physical space or location. The 2D or 3D models can be any representation of physical surroundings at an area and can consist of a plurality of images which form the model. A person of skill in the art should understand that model, view, and representation can be used interchangeably, and examples to 3D models can also be applicable to 2D models or views, or other representations of a physical location.

The enhanced model may be dynamically tuned to display virtual content at one or more prescribed locations such as for example over signage or storefronts. The prescribed locations and virtual content may be discovered and/or tuned based on multiple factors including but not limited to, for example, usage, as well as other factors discussed below. According to some aspects of this technology, virtual spaces can be defined on the models described herein to identify and create virtual "real estate" or virtual "spaces", which can be defined in, for example, in pixel space of the imagery or defined in some 3D world coordinates, such as Earth-centered ECEF, and then projected onto any imagery or 3D representations, including 3D meshes, used to model a physical environment. As explained further below, the virtual "spaces" can be used to enhance a "base" representation of a physical environment or a representation of a real world environment.

More generally, the technology can be used for identification of areas of interest within a 2D, 3D, or other model or representation of a physical environment or location; the marking or identification of areas of interest within the model as potential areas for virtual or digital enhancements, overlays, modifications, redactions, or additions; associating the virtual area with a user; providing to the user ownership, access to, or control of the virtual overlays or virtual spaces; submitting content for display to the virtual overlay; review of the content according to a database or rules; integrating the content into the virtual area or virtual environment of a 3D model; displaying the content along with the three dimensional model; receiving a user interaction related to the content; changing or causing an action to be taken based on the user interaction. In some examples, the foregoing examples can be performed on 2D models, such as for example, maps or satellite images. In some examples, the virtual space can be "claimed" or "associated" with an owner or user of the underlying physical location. In other examples, content providers or advertisers can "buy" or "rent" the virtual real estate in an image, representation, or map and interact with the virtual real estate in the representation to define or edit the content, interact with the moderation, or define a schedule for content being displayed. In other examples, the virtual space can be viewed by a user who views or interacts with content which has already been uploaded, such as for example, clicking on the content, clipping coupons, ordering items, viewing contextual or location related information.

For example, in some aspects, the disclosed technology identifies virtual spaces within a 2D or 3D model which can be utilized for creating interactive, customizable, updatable, or other spaces. In some examples, the images which underlay the 2D or 3D model can be analyzed using image content analysis (ICA), a general-purpose machine learning (ML) system, capable of finding entities of hundreds or thousands of different types. ICA can be run on large imagery collections such as a database with 2D or 3D models of physical locations, where the model can be made of, among other components, a collection of images. In some examples, the 2D or 3D models, or images therein, can further be analyzed using specialized machine learning segmentation systems in addition or in lieu of ICA. Analysis of a model will typically include analysis of the underlying images that form or are otherwise associated with the model. In other examples, only certain images will be analyzed by ICA or ML systems. Such specialized machine learning systems can be custom designed, tailored, or specifically trained to identify areas of the 2D or 3D model or related imagery as potential areas or candidates of interest in the 2D or 3D model. In addition, the ICA or specialized systems go beyond simply looking for text, logos, or other symbols which may be present within the 2D or 3D model or related imagery.

In some examples, the identified virtual spaces can be used as or provided into a database for analysis of viability, valuation, or other metrics related to or derived from at least a metric associated with the virtual space. In some examples, the virtual space can be analyzed to determine a particular category of messages related to the space. In other examples, the space can be found to be suitable for advertising content, and the space can be monetized or bid upon by users. In other examples, a user may be able to mark a certain virtual space or portion of an image as inappropriate or undesirable for a particular use or virtual space, and such information can be used by ML systems in identification of additional spaces. In some examples, metrics or values associated with a particular virtual space may depend on population or business density nearby or user views of the map here. Viability of a space may depend on a metric or the degree to which a view of a virtual area is unobstructed or the amount of the existing context within an area.

As used in this disclosure, a virtual space can refer to a portion of a 2D or 3D model or environment. As one example of a 2D or 3D model is a representation of physical surroundings at an area which can consist of a plurality of millions of panoramic images. The panoramic images can be related to one another to create the virtual representation. Within the virtual representation, virtual spaces can be identified as a subset of the 2D or 3D model or representation. In some examples, a virtual space may be a 2-D or 3-D closed polygon, a set of pixels, a half open space, a semi-bounded space, or other type of space, a combination of union of two polygonal spaces, a convex continuous bound space, or a concave continuous bound space.

Example Systems

Figure 1B:
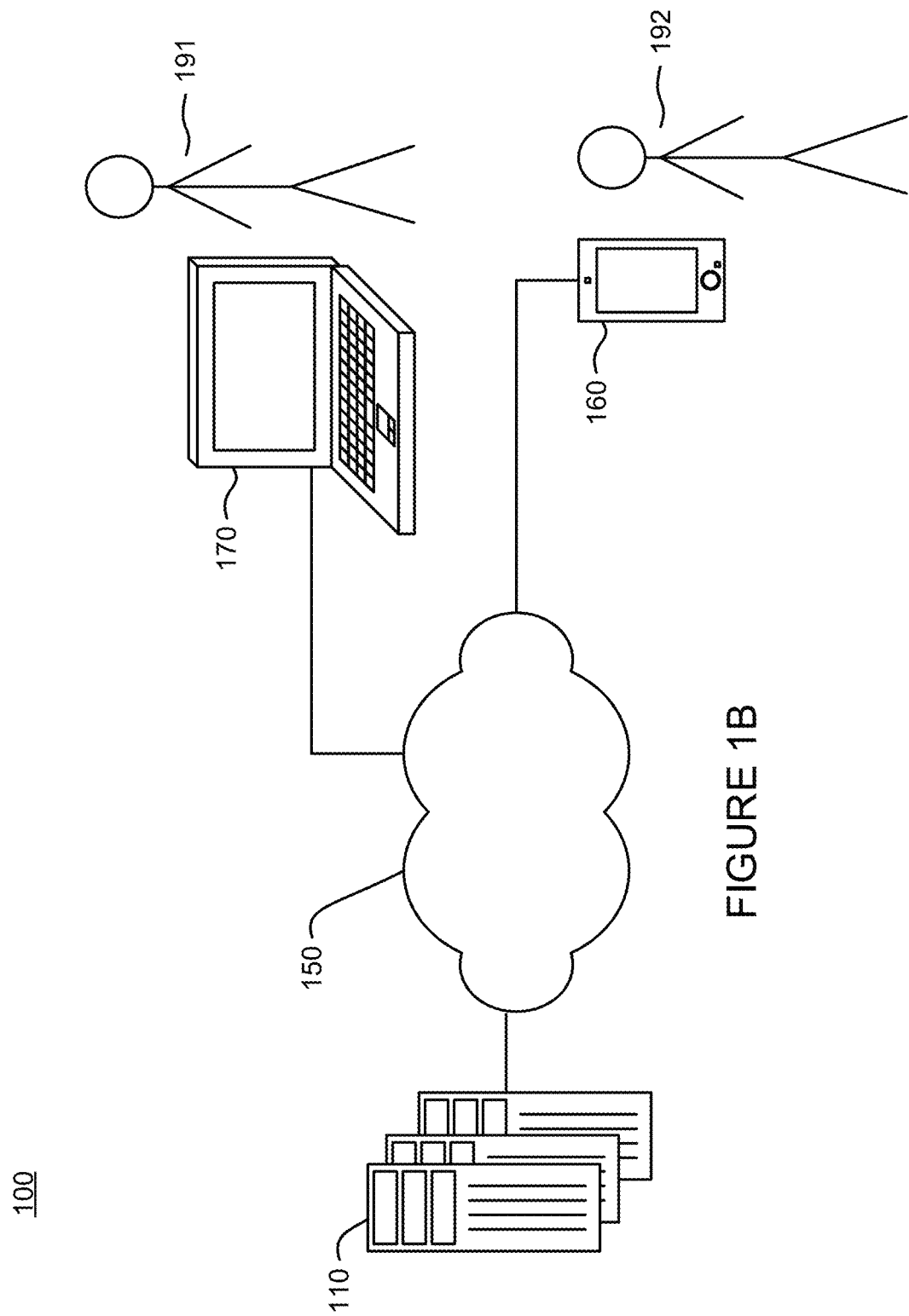
FIG. 1B is a pictorial diagram of the system of FIG. 1.

FIGS. 1A and 1B include an example system 100 in which the features described above may be implemented. It should not be considered as limiting the scope of the disclosure or usefulness of the features described herein. In this example, system 100 can include one or more computing devices 110, which may be connected to further computing devices 160 and 170 over a network 150.

Computing devices 110 can contain one or more processors 120, memory 130 and other components typically present in general purpose computing devices. The memory 130 can store information accessible by the one or more processors 120, including instructions 132 that can be executed by the one or more processors 120.

Memory 130 can also include data 134 that can be retrieved, manipulated or stored by the processor. The memory can be of any non-transitory type memory capable of storing information accessible by the processor, such as a hard-drive, memory card, ROM, RAM, DVD, CD-ROM, write-capable, and read-only memories.

The instructions 132 can be any set of instructions to be executed directly, such as machine code, or indirectly, such as scripts, by one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below. In some examples, instructions 132 can be implemented on special hardware or on another computational device not shown.

Instructions may control various components and functions. For example, the instructions may be executed to perform any of the methods indicated in this disclosure. In some examples, algorithms can be included as a subset of or otherwise as part of instructions included on system 100. Instructions can include algorithms to execute any of the methods or a subset of the methods described within this disclosure.

Data 134 can be retrieved, stored or modified by the one or more processors 120 in accordance with the instructions 132. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 120 can be any conventional processor, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1A functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110 can be at different nodes of the network 150 and capable of directly and indirectly communicating with other nodes of network 150. Although only a few computing devices are depicted in FIGS. 1A-1B, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with a storage system as well as computing devices 160, 170 via the network 150. For example, one or more of server computing devices 110 may use network 150 to transmit and present information to a user, such as user 191, 192, on a display, such as displays 165 of computing devices 160, 170. In this regard, computing devices 160, 170 may be considered client computing devices and may perform all or some of the features described herein.

Each of the client computing devices 160, 170 may be configured similarly to the server computing devices 110, with one or more processors 162 and memory, including data 163 and instructions 164 as described above. Each client computing device 160, 170 may be a personal computing device intended for use by a user 191, 192 and have all of the components normally used in connection with a personal computing device such as a central processing unit (CPU), memory (e.g., RAM and internal hard drives) storing data and instructions, a display 165 (e.g., a monitor having a screen, a touch-screen, a projector, a television, or other device that is operable to display information), and user input device 166 (e.g., a mouse, keyboard, touch-screen or microphone). The client computing device may also include a camera 167 for recording video streams, speakers, a network interface device, and all of the components used for connecting these elements to one another.

User interfaces or user input devices on the client device may include a screen which allows a user to interact with the client device, such as a touch screen or buttons. A display can also be included such as an LCD, LED, mobile phone display, electronic ink, or other display to display information about computing system 310. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for the client device to be updated and information generated by the client device to be shared to other devices. In some examples, communication interface(s) can send information stored in memory to another user device for display, storage or further analysis.

Although the client computing devices 160, 170 may each comprise a full-sized personal computing device, they may alternatively comprise mobile computing devices capable of wirelessly exchanging data with a server over a network such as the Internet. By way of example only, client computing device 160 may be a mobile phone or a device such as a wireless-enabled PDA, a tablet PC, or a netbook that is capable of obtaining information via the Internet. In another example, client computing device 170 may be a head-mounted computing system. As an example the user may input information using a small keyboard, a keypad, microphone, using visual signals with a camera, or a touch screen.

As with memory 130, storage system 140 can be of any type of computerized storage capable of storing information accessible by the server computing devices 110, such as a hard-drive, memory card, ROM, RAM, DVD, CD-ROM, write-capable, and read-only memories. In addition, storage system 140 may include a distributed storage system where data is stored on a plurality of different storage devices which may be physically located at the same or different geographic locations. Storage system 140 may be connected to the computing devices via the network 150 as shown in FIG. 1 and/or may be directly connected to any of the computing devices 110, 160, 170.

Storage system 140 may store 3D models or representations of an environment, such as model 141. In addition, storage system 140 may store information associated with model 141, such as that generated or derived using the methods herein, such as spatial information 142. Spatial information 142 can include for example, a database of virtual areas derived or generated from the methods described herein. Storage system 140 may include image data of a location, a spatial database of vector data to define bounds of physical structures, such as roads, parking lots, buildings, or buildings.

FIGS. 2A-2D and 3 illustrate various aspects related to the technology disclosed herein. Although the term 3D model or 3D representation is used in the description below to illustrate the aspects of FIGS. 2A-2D and 3, a person of skill in the art would understand that a 2D model or representation, such as an aerial map of an area, could also be used for the methods and techniques described below.

Figure 2A:
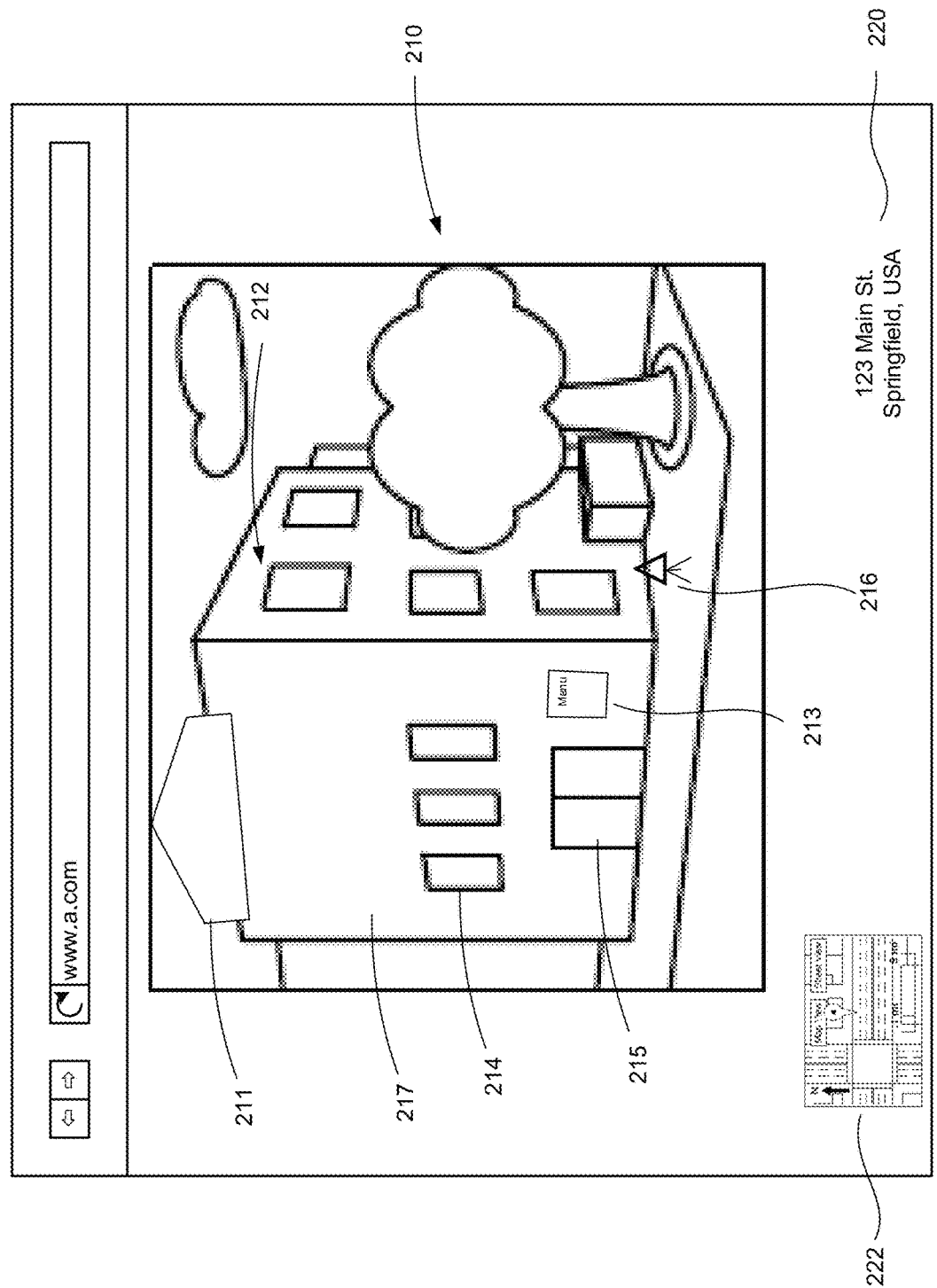
FIG. 2A illustrates aspects of a user interface.

FIG. 2A illustrates an example of providing a view 200 on a user device. The user device may be a portable device, such as a tablet, cell phone, wearable (e.g., smart watch), personal digital assistant, personal navigation device, or more generally any portable computing device. It may also comprise a laptop, desktop or more generally any non-portable computing device. View 200 can include a representation 210. Representation 210 can be a 3D model or 3D representation of a physical location. Additional information can be included in view 200, and other information associated with a 3D model or 3D representation of a location. The additional information includes a 2-D representation of the physical or geographical area surrounding representation 210. In addition, address 220 can indicate the geographical address or GPS location of the information. In some examples, representation 210 can be accessed through a web-browser. However, in other examples, the representation can be part of an augmented reality display, a virtual reality headset, displayed on another user device such as device 160 or device 170. A virtual reality headset or augmented reality display device may additionally contain information about orientation, angle, or relative position of the headset, and the view that is being displayed within the headset or device. For example, the angle above or below a line parallel to the ground may be contained within the augmented reality display.

Representation 210 illustrates spaces on building 212 such as space 217, menu 213 on the side of structure 212, and a billboard or sign 211 on the top of building 212, windows, such as window 214, and a door 215. Building 212 can have multiple sides visible in representation 210. As will be discussed in the next example, parts of representation 210 can be identified as virtual spaces which can be included in view 210. Representation 210 also includes objects outside structure 212 which are unlabeled for clarity, such as a tree, other side of the building, a sidewalk, a road, and a cloud. Representation 210 can include other objects such as a sign 216 on the side of building 212.

Figure 2B:
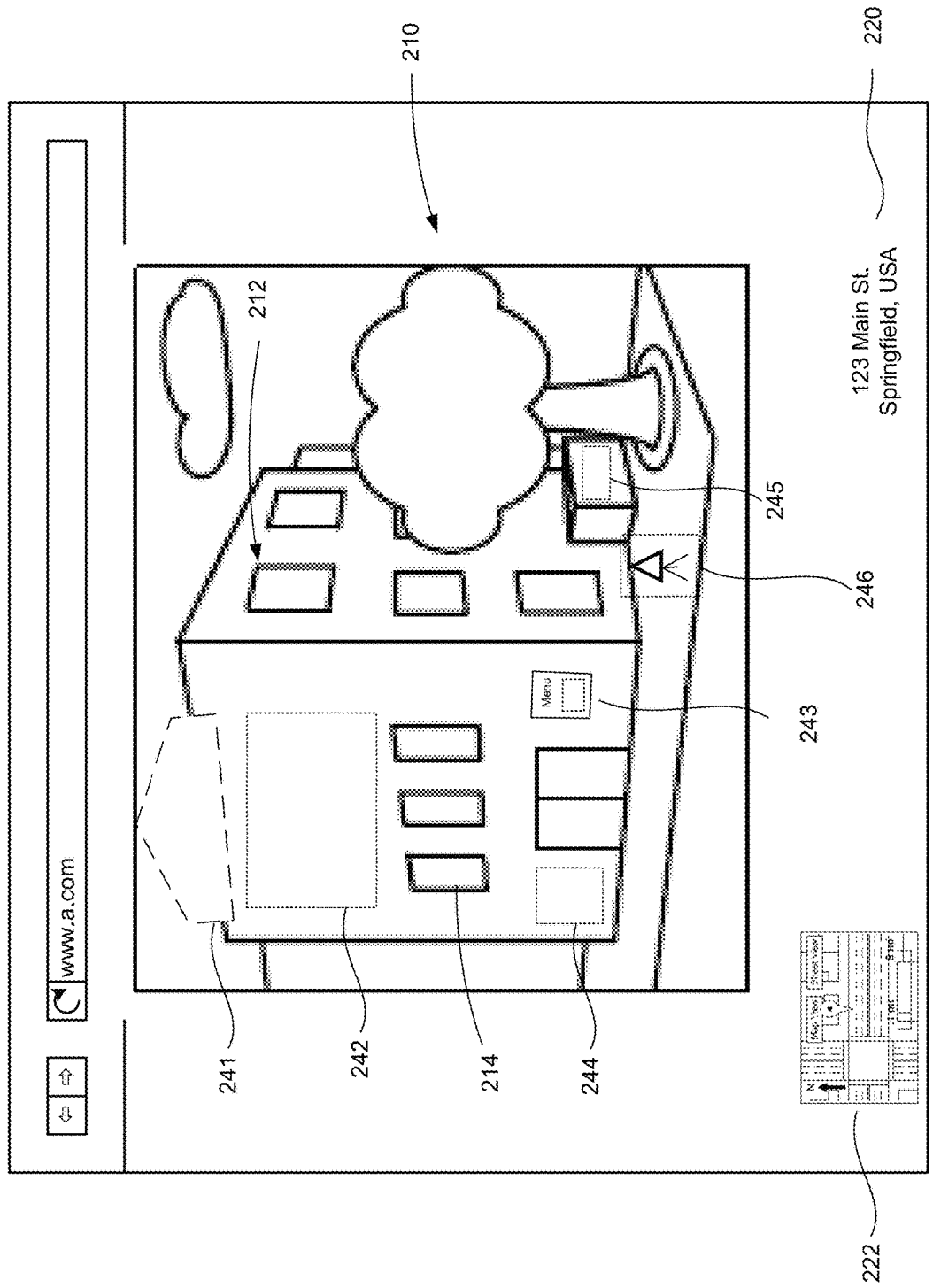
FIG. 2B illustrates aspects of a user interface.

FIG. 2B illustrates an example view 240 wherein portions of the view 210 have been identified as virtual spaces. In some examples, the virtual spaces in view 240 can be identified by a user for use in training models. In other examples, virtual spaces in view 240 can be identified by machine learning models described herein. A virtual space can be a 2D finite space, such as a polygonal shape. In other examples, a virtual space can be a finite 3D shape. For example, spaces 241-246 have been identified within representation 210. Example technologies for identifying virtual spaces within representation 210 are discussed within this disclosure, such as with reference to FIGS. 2A to 2D, 3, and 4. In some examples, such as with respect to sign 211, a virtual space 241 can be identified which corresponds to a physical object. Virtual space 241 can occupy to the totality of sign 211. In other examples, virtual space 241 may be a subset of the sign 211. Virtual space 242 can be part of a suitable area of building 204, such as an area above window 214. Other virtual spaces can be identified within building 212, such as virtual space 244 below window 214. Virtual spaces can also be identified at locations of view 210 which correspond to other physical objects. For example, virtual space 243 can correspond to menu 213 or a smaller space within menu 213. In some examples, the virtual space can add to the textual or data information existing with menu 213. Virtual space 245 may be on the side of a smaller object while virtual space 246 may be identified on a sign near building 212 but not physically part of the building.

In some examples, the identification of virtual spaces can be based on rules, algorithms, or other preferences stored in computing device 110 or storage 140. For example, the virtual spaces or virtual areas described above can be based on relative density of virtual spaces, type of virtual space, relative visibility of a space within a particular image or view, relative visibility of a space across multiple views or angles, viewshed, prominence of a space, elevation, or other rules. In other examples, the identification of virtual spaces can be based on users who report or otherwise identify boundaries for the virtual spaces. In other examples, machine learning based tools can identify virtual spaces. The machine learning techniques can be based on locations that are in close proximity to any markers, such as characters, billboards, text, signs, and when the location has sufficient characteristics such as size, viewshed, prominence. In other examples, the machine learning technique can be tuned based on additional vetted training data.

In some examples, ML models can be used to identify text, signs, billboards, or other likely locations within a picture as candidates for virtual spaces, and also look for other characteristics of likely virtual spaces, such as signs, scripts, text, or numbers, and determine virtual spaces within an image nearby such a candidate. The virtual space may be determined near such a candidate based on the angle of the location, the elevation, the prominence, the distance from a candidate, or other characteristics. In some examples, the provider of the representation and virtual space can act as a broker to broker transactions between an owner or stakeholder of a virtual space and an entity which desires to use the virtual space to display content.

In some examples, the virtual spaces or virtual areas can be checked against a database of rules or known locations that comprise locations or points of interest that should not or cannot be used or modified for the display of virtual spaces. As an example, some locations or points of interest for which a 3D model or representation should not include additional virtual spaces may include private property, copyrighted locations, government buildings, military bases, privately owned billboards, or other sensitive areas.

In some examples, the identified virtual spaces or virtual areas, such as virtual spaces 241-246 can be presented to human operators or users for refinement. For example, prediction can refer to methods or metrics of identifying or generating virtual space. In some examples, a human operator can refine the predictions related to virtual spaces made through the machine learning methods. For example, a prediction can be refined or centered on a physical structure. In other examples, a prediction with low confidence can be verified or presented to a human operator for verification. In other examples, this step can be performed by the user or owner of the physical structure based upon or related to which the virtual space was generated, determined, or selected. In some examples, multiple predictions for virtual spaces can be combined by a user. In other examples, a virtual space can be divided into multiple virtual spaces or in different topologies by a user. In yet other examples, some predictions can be rejected by a user as being unsuitable for a particular use or undesirable based on the user's preferences. In yet other examples, input from the user can be combined with information associated with the user to enhance or refine training of the machine learning algorithms. In further examples, virtual spaces can be classified based on additional information related to other points of interests or locations relative to the physical structure on which the virtual space is illustrated.

Figure 2C:
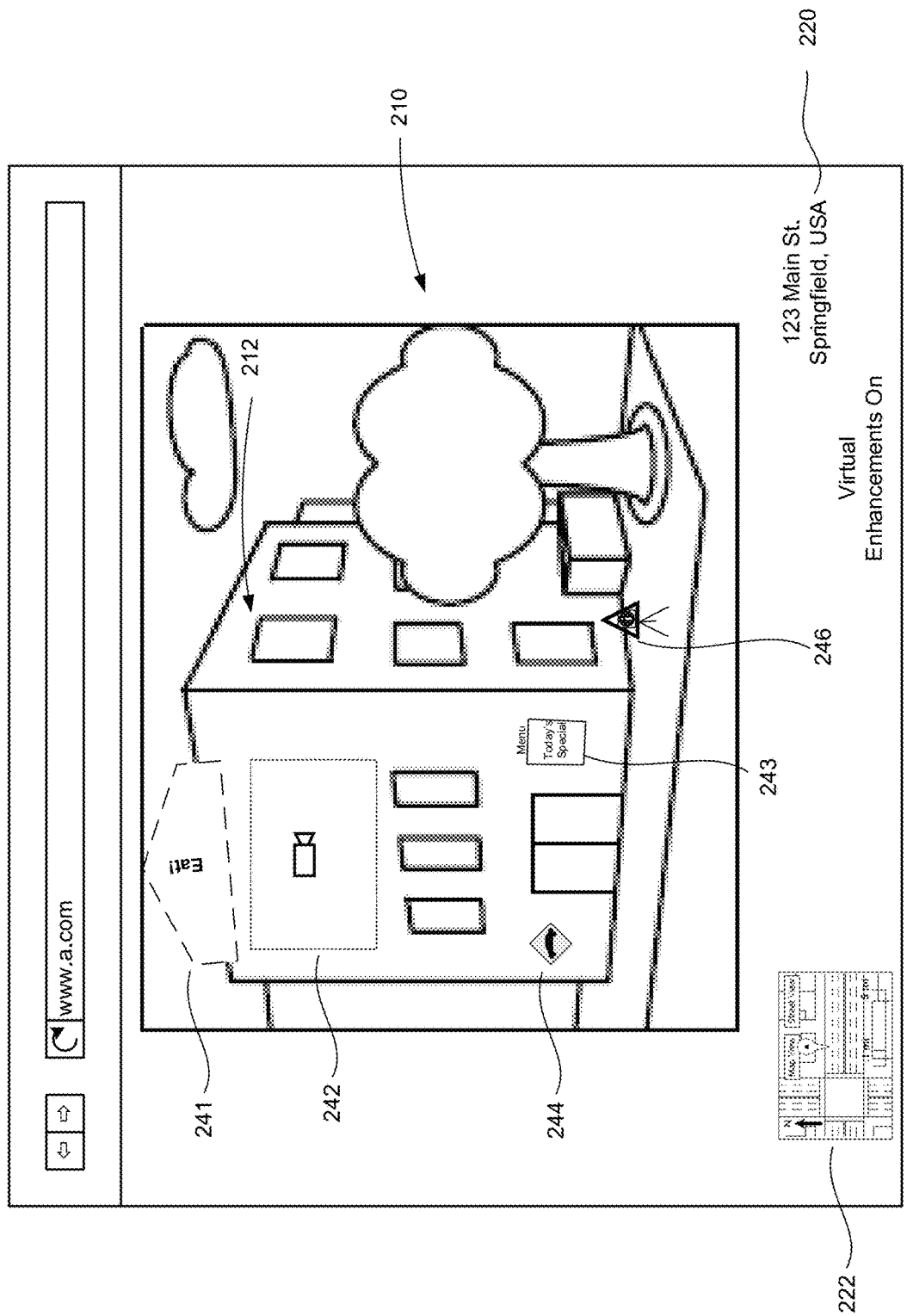
FIG. 2C illustrates aspects of a user interface.

FIG. 2C illustrates an example view 250 wherein certain information is added to the virtual spaces discussed with reference to FIG. 2B in representation 210. The addition of content to the virtual spaces can be added to display 210. In some examples, the virtual spaces can have different opacities, colors, or indicators to indicate that they are added to or modifying representation 210. In some examples, the content can be configured such that even when interacting with representation 210 on a whole, such as panning, moving through the representation, or changing a perspective, the perspective or feel of the virtual spaces can remain consistent with that of representation 210. Options for turning on and off the virtual enhancements by a user can also be included in view 250.

For example, illustrated in FIG. 2C is the representation of "Eat!" to virtual space 241. This particular content can be based on user preferences. In other examples, the content can be based on advertisers or content provider's preferences. In yet other examples, the look, feel, and other characteristics of the content, such as font, style, or size can be based on a combination of user preferences and content provider preferences.

In virtual space 242, a video or other interactive content can be displayed. In some examples, the content being displayed can be based on user preferences, preferences set within the device being used to view representation 210, or characteristics of the device being used to view representation 210.

Virtual space 244, which may be smaller than virtual space 242, can display an icon. In some examples, the icon can be interactive or based upon the context of representation 210. For example, if representation 210 is near an airport, train station, or other location where users may desire a car sharing or transportation service, a car icon can be illustrated in virtual space 244. In some examples, the icon can be "clicked upon" and interacted with to present additional options or information to a user viewing representation 210. For example, once interacted with, the car icon can present various commercial options for requesting a transportation service. In some examples, upon selection of one the aforementioned options, another application or program on a user device, such as device 160 or 170. For example, a taxi application on a mobile phone, augmented reality device, or virtual reality device could use the representation and the virtual space to indicate where a user should wait for a taxi, or provide information about available taxi options, such as prices. In other applications, such as a real estate application, information about available listings or prices can be provided by the application using the representation and the virtual spaces.

Virtual space 243 can be displayed on top of the menu displayed in FIG. 2B as part of representation 210. In other examples, virtual space 243 can have content configured in a manner which augments the content displayed in menu 213. In other examples, the former content can be analyzed and read, and moved to another section of representation 210 while the content of the virtual space can include information related to menu 213. For instance, menu 213 can belong to a particular owner or shop and information related to the owner or shop can be reflected based on an input from the shop owner or user. In one example, the daily menu or specials can be updated within virtual space 243 and may comprise a menu associated with an eatery located in the building shown in FIG. 2C.

In some examples, other applications or programs can utilize aspects of or the entirety of representation 210 as well as one or more virtual spaces described above. In some examples, the applications can define or provide information to server 110 or storage 140 for the virtual spaces described above or the behavior, content, or interactivity of the virtual spaces or items displayed therein. For example, if an application related to food is utilizing a 2D or 3D model as part its software, the application can download content related to only food or integrate virtual spaces related food or restaurants in its particular display of representation 210 and related virtual spaces. In another example, if a user is on a holiday and has predetermined a particular reservation at a hotel and set preferences related to a ride sharing service, the virtual spaces used as part of an augmented reality or virtual reality display of representation 210 can be configured to only display content related to a ride sharing service. For example, a "wait here" or "your ride will arrive here" can be displayed within a virtual space. The representation 210 can be modified based on rules related to the application or program utilizing or accessing the representation.

Virtual space 246 can be displayed on the space corresponding to sign 216. In FIG. 2C, an information "i" is displayed within virtual space 246. A user could click on or otherwise interact with the "i." In some examples, default information can be displayed within or close to virtual space 246. For example, a bus schedule could be displayed or information about buildings nearby, or times businesses are open could be displayed when a user clicks on the "i," the "i" is central to the user's view, or the user is within a certain predetermined distance from the "i." According to one example, the type of information to be displayed may also be stored in association with user account information, such as for the user that created the annotations or any other users authorized to access the annotations.

Virtual space 245 can optionally not be displayed to an end user based on the user's preferences, lack of content for that space, or size, dimensions, or other characteristics of either view 210, other virtual spaces being displayed, or other rules related to the display of spaces, such as those based on time, content, or location.

In some examples, multiple pieces of content or information may be associated with one virtual space. In some examples, a user can cycle through or see the pieces of content associated with the virtual space. In other examples, the content being displayed can be contextually based, such as based on user preferences or an application using or integrating the representation and virtual spaces.

Figure 2D:
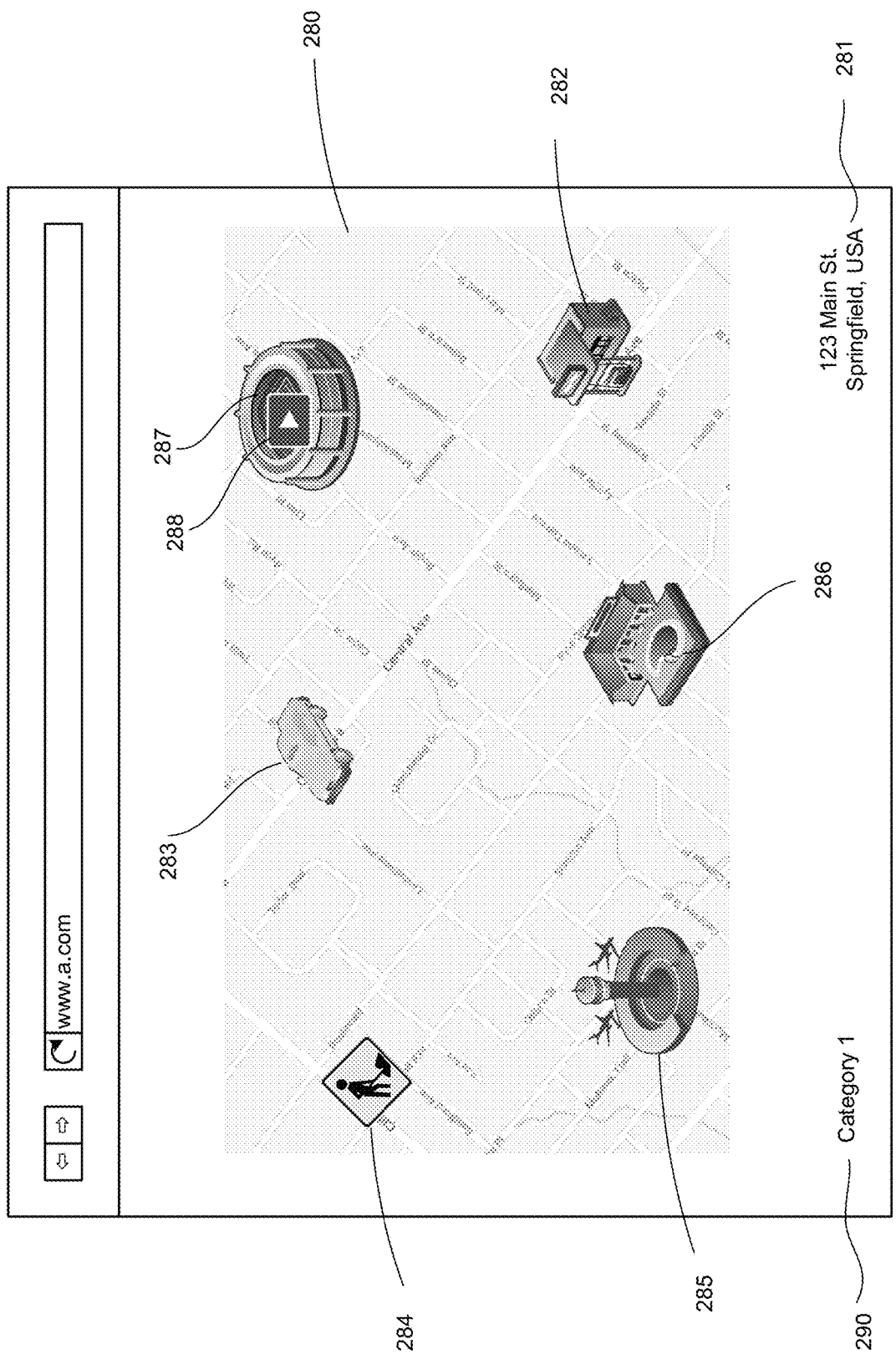
FIG. 2D illustrates aspects of a user interface.

FIG. 2D illustrates a representation 280. Representation 280 is a two-dimensional map. The map can be loaded responsive to an address entered by a user, such as address 281. The representation or virtual spaces being displayed thereon can also be modified based on a user input, such as by selection 290, wherein "category 1" has already been selected by a user.

In some examples, representation 280 may be a satellite image of an area. Similar to the examples given above, techniques disclosed herein can be used to identify or describe various virtual spaces. The virtual spaces can be overlaid upon the representation 280. In some examples, information can be combined from the 3D representations with the 2D representations to create a seamless transition between the two representations or show the same or similar information in virtual spaces which correspond to the same location. Virtual spaces 282-288 can be identified within representation 280. Some virtual spaces can display three dimensional icons while others can display 2D content. Other variations of the types of content included within virtual spaces would be appreciated by a person of skill in the art.

In some examples, classifications related to a virtual space can be identified. For example, virtual space 285 can be identified as a public space, such as airport 285. Other classifications can also be generated for the other virtual spaces. For example, a virtual space can be identified as a business. Virtual space 282 can be a business space, such as a gas station, and virtual space 283 as a taxi location. Other virtual spaces can be defined ad-hoc based on a user request, such as virtual space 284.

In some examples, virtual spaces can also exist in multiple spaces, such as for example, an entire street or a portion of a street. For example, virtual space 284 may be defined at several disjoint locations which are not connected. For example, virtual space 284 may be defined to exist at multiple intersections along a particular street.

In some examples, different virtual spaces can be integrated into "layers" of overlays which overlay or sit on top of representation 280. Thus, depending on specific rules, user selections, or instructions, different virtual spaces can be overlaid onto representation 280. In some examples, the layers could be an application specific layer, such as for a ride-sharing application, a weather layer, a layer related to specific use cases, such as a gas layer or electric vehicle charging layer, a tourism layer, entertainment layer, or a medical services layer. The tourism layer can include for example, which could include virtual spaces related to hotels, restaurants, landmarks, scenic routes, or the like, the content of which can be provided by third parties. An entertainment layer can include virtual spaces related cinemas, theaters, or stadiums, content or control of which is provided by third parties. A medical services layer can include virtual spaces related to clinics, hospitals, or other medical information. In some examples, a government agency, such as a state's Department of Transportation, may have access to virtual spaces belonging to a transportation layer. In some examples, the government agency may be able to update information for display in a transportation layer. In some examples, access to specific virtual spaces or areas can be based on the basemap, base representation or view, APIs related to the virtual space, or other APIs related to the various layers. In other examples, the display of one or more layers can be toggled based on user preferences, user input, or instructions related to the application using the particular representation. In other examples, one or more views or representations may be associated with one another, such as for example, a satellite view of a location and a map representation of a location. In some examples, identification of virtual spaces from one view may be associated with another representation of the same area to enhance discovery of virtual spaces and to allow for virtual spaces to be added to other representations of an area, such as between a satellite image and a simplified map of the area.

In other examples, a particular organization may own a physical space to which a virtual space is related. For example, virtual space 287 may be a stadium belonging to a private organization. The private organization may control the virtual space corresponding to the stadium. The private organization may be able to provide content for viewing in the virtual space, such as a promotional video 288. In some examples, a database of rules can control the types of information being generated based on user preferences of the user viewing representation 280. In other examples, the controller for content of virtual space 287 can expose or allow additional third parties access through additional APIs. For example, content 288 can be displayed within virtual space 287, where content 288 itself belongs to another party.

In some examples, a determination of whether to rent, license, or provide for use to a third party a virtual space can be based upon a bidding system, a pay-per-view, a per-imagery-tile view, a per-imagery-panoramic view, or demand metrics. In some examples, GPS data, GLS data, requests to a database, and mobile signals can also be used to determine how frequently a particular image gets viewed in an augmented reality or virtual reality context by users present on the ground and near the location depicted in the virtual space. In some examples, a metric based on the combination of desktop and mobile representation or map views is possible, such as through a weighted linear combination, which can be supplemented by an aggregate measure of searches for businesses near that location. In some examples, publicly or semi-public available information can be included in the determination, such as the profitability of the general area, type of business, times of business operation, average business rental in the area, or other ad or display space costs in the area.

In some examples, the amount of virtual space being available for use to third parties or added to representation 280 can be determined by a database of rules. In some examples, it is important to the user experience that no image gets too cluttered with advertising on virtual spaces or that advertising is only being used where it is appropriate and likely to generate user interest. Thus, most such "empty" virtual spaces whose imagery use metric falls below a certain minimum would not be designated as available. Further, particular occupancy requirements can be enforced limiting the number of virtual spaces per a specific image area to maintain a viewing experience or ensuring some distance separation. For example, a rule can be "no more than 10 virtual spaces used per a specific road length along a street level imagery run", with each new sale of rental of a virtual space being priced higher than the previous.

In some examples, virtual spaces at a particular location, such as a particular address of GPS location, within a 2D representation can also be associated with virtual spaces at that same location within a 3D representation of that location. In some examples, the virtual spaces of the 2D representation and the 3D representation can be correlated.

In some examples, a virtual space can further be associated with additional information, such as meta-data, tags, location, or rules which can define properties of how the virtual space or content thereon is displayed. For example, information can be added to the virtual space to only allow a static image to be displayed within the virtual space. Some metadata may not be exposed to users external to the provider of the representation as such metadata may be used to drive the pricing of that space. Other meta-data may be added by users.

In some examples, an interface can be provided to a first user for editing or modifying a virtual space or uploading content for display within a virtual space, while an interface for viewing the content displayed in the one or more virtual spaces can be provided to a second user. Thus, in some examples, different users can have different interfaces for either providing content for display in a virtual space or viewing content in a virtual space. The first user may also be a backend server which uploads content into virtual spaces with certain authentication information to seamlessly provide content for upload into certain virtual spaces.

Although FIGS. 2A-2D were illustrated as being part of a web page or being viewed through a web browser, a person of skill in the art should appreciate that many representations through different devices, platforms, and media are possible, such as for example, a mobile device, an application on a device, a virtual reality headset, an augmented reality view, or other view.

Figure 3:
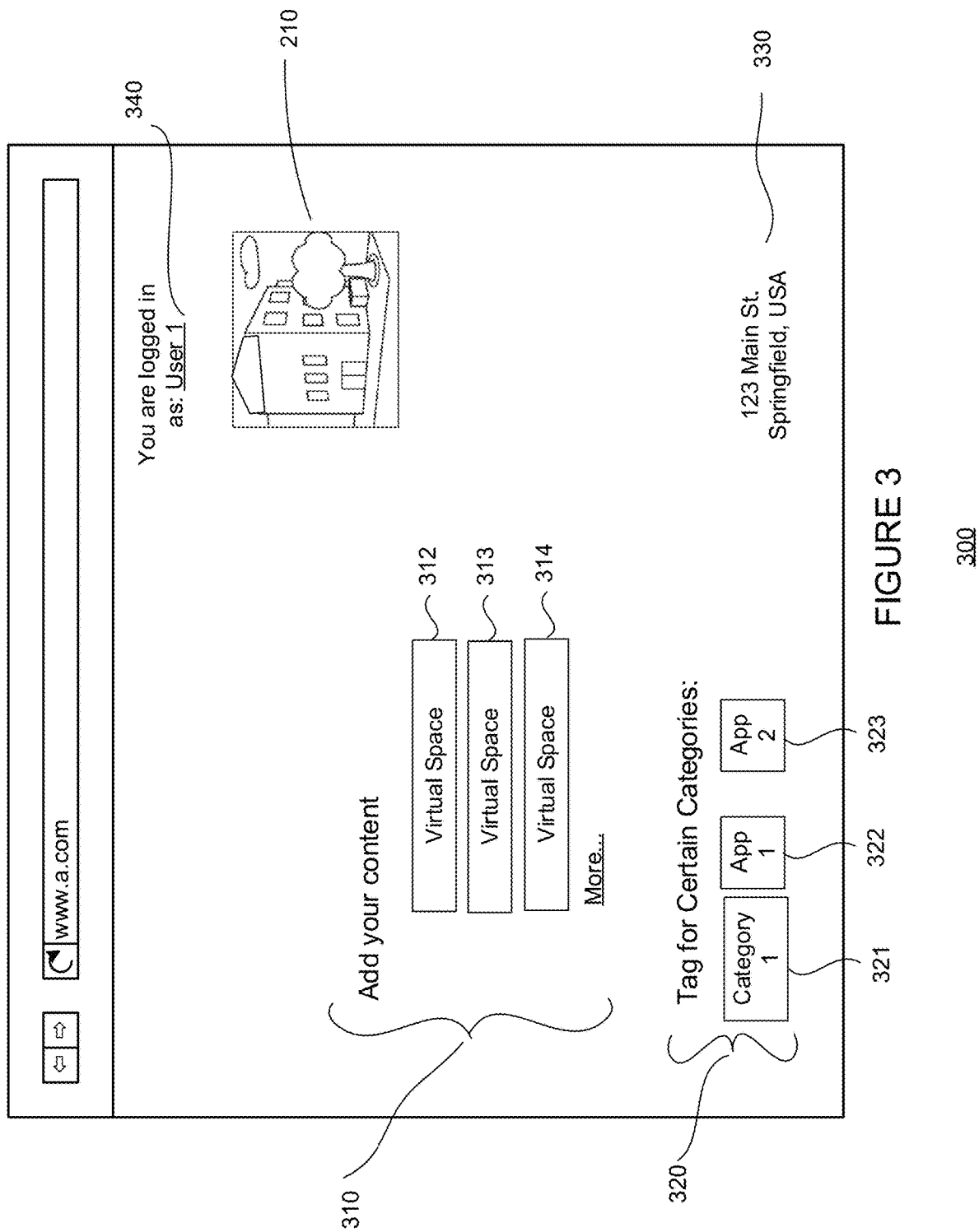
FIG. 3 illustrates aspects of a user interface.

FIG. 3 illustrates an example screenshot of a web page 300 enabling a User1 340 to add or modify content related to virtual spaces, such as virtual spaces 241-246, related to address 330 or representation 210. For example, the web page 300 may include an input field 310, where User1 340 can identify one or more other pieces of content to add for display in virtual spaces 241-246. In some examples, User1 340 can take ownership of the virtual spaces 241-246 related to representation 210 or address 330. In some examples, as each virtual space corresponds to a physical space, which in turn can correspond to an address, each virtual space can belong to a user who has ownership or other legal rights associated with the physical space associated with representation 210. In some examples, multiple users may own or have the ability to submit content related to virtual spaces 241-246.

By way of example only, the User1 340 may content or other information in entry fields 312-314. While only a few entry fields are shown, any number of fields, or one field permitting entry of multiple pieces of content, may be provided. In the example of FIG. 3, web page 300 may also include a field 320 to enable User1 340 to suggest or add categories or other programs which can utilize or be related to virtual spaces 241-246.

In some examples, the content displayed in a virtual space can be provided to by a user and can include time information or other metadata, which can allow for different content to be automatically displayed at different times of the day. In other examples, the content can include orientation data, such that, depending upon the orientation of the representation and the virtual space, different content can be displayed. In other examples, a tag or metadata identifying the type of content can be provided by the user, and a database of rules can determine the number of virtual spaces containing the same type of content. For example, the content could be "information," "advertisement," or "interactive." In some examples, sub-tags can be included to form a hierarchical structure of tags. In some examples, a hierarchical structure of tags could be provided by the entity providing the interface and the representation. In some examples, the tags or other meta-data provided in connection with the virtual space could be used by information related to user preferences, so that user preferences are matched when displaying the content within virtual spaces to users.

In some examples, the content provided by a user can be stored within a database in any suitable format. In some examples, the content can be provided as a link or other reference to a location of the content, which can be downloaded or accessed by a server. In some examples, the server may be controlled by the provider of the representations and virtual spaces. The provider of the virtual spaces may also keep a database identifying virtual spaces and content associated with each virtual space, as well as rules controlling both the display of a particular virtual space or the content within a virtual space. In some examples, the content associated with a virtual space can be automatically downloaded when a user who is only viewing the representation and the virtual spaces, views the virtual space. In other examples, the content can only be displayed when a user clicks on a virtual space. In yet other examples, the content can be loaded upon a user's perceived distance from a virtual space within a representation, so that only virtual spaces which are a certain distance away from the user's point of view in the representation are loaded. In other examples, only certain virtual spaces belonging to specific layers can be loaded, based on a particular use case or user preferences. In yet other examples, the content can be displayed when an application making use of a representation and virtual spaces requests or controls that content be loaded, such as through an API or other request. For example, the content might be loaded only upon a taxi being a predetermined number of minutes away from a user. The content may also change or be updated based on how far the taxi is, such as counting down the number of minutes, or updating information about the particular taxi, its characteristics, such as its color or make, or information about the ride itself. In such examples, the content being provided to the virtual space may be accessed from a third party provider in part or whole, such as through a URL location, API, or other method. Thus, different views and rules are possible for virtual spaces and representation are possible for users who provide or control the content for display in the virtual space and the users who only view the representation, virtual space, and content therein.

In other examples, access to some virtual spaces can be marked as "public" allowing any member of the public to access and post to the virtual space, such as a public forum or a side of a government building. In other examples, the virtual space may be "semi-public" only allowing certain users who are a member of a group to participate in providing content for that space. In yet other examples, the virtual space can be marked as "commercial" and only individuals who own the space through a bidding or other process can provide content for display in that space.

Example Methods

As explained below, the following methods can be used to identify and display information in virtual spaces within a 3D representation. In some examples, the methods and algorithms described herein can be performed on systems described in reference to FIGS. 1A and 1B such as for example, computing device 110, computing devices 160, or computing device 170.

As described herein, methods or techniques can be used to identify or generate portions of a 3D model or representation of a physical environment which correspond to under-utilized, unused, or dead space within the 3D model. In some examples, specialized machine learning systems can be used to identify particular characteristics within the 3D model. In some examples, image content analysis (ICA) techniques or models can be used. In other examples or in specialized use cases, other machine learning or artificial intelligence techniques can be used. In some examples, multiple models and techniques can be used to aggregate predictions of virtual spaces.

The models may "look for" or attempt to identify "virtual space" suitable for displaying content. This virtual space may be located where text, logos, other symbols appear or it may be close to those areas and the model can be trained to identify such suitable spots, i.e. storefronts or portions of storefront associated with a single specific business (e.g., area under the sign/text), portions of the building wall close to sign/text (e.g., the wall/windows just above the sign, etc.) with the focus on these areas being close to the building or business, large enough to accommodate some content, or also free of any visual content that has to be left unobscured or that serves as a marker that this space cannot be utilized. A ML model will attempt to make all these decisions based on the training data provided. In addition, upon results from the ML model, human vetting of the results is possible which can be fed into the model to further refine the predictions as necessary. In some examples, the ML model can attempt to identify the type of business or building and its suitability for displaying content, such as identifying the roof of a particular business in a satellite image, and based upon other information related to that business.

Analysis of the 2D or 3D models or other representations can consist of analysis of underlying images which form part of the model. In some examples, the disclosed technology will look for "virtual space" suitable for advertising or other content, which may be located where text, logos, or other symbols appear, such as storefronts or portions of the storefront associated with a single specific business, portions of a building, wall, or other feature close to the sign or text, or a focus on areas close to where the business is identified. Further, aspects of the technology can ensure that identified virtual spaces are visible and large enough to allow content to be integrated into the virtual space, ensure that some content can be displayed in the space, or otherwise mark a particular virtual space as one which cannot or should not be utilized.

In some examples, a building or other structure related to a location within the 3D model can be associated with tags at or near that location within the 3D model. In turn, the building or other structure can be associated with a user who owns, has control of the building, or a business occupant inside the building.

In some examples, a 2D representation of a physical location can be enhanced with information generated from the 3D representation. For example, the virtual spaces established within the 3D representation can be associated with the virtual spaces established within the 2D representation. In some examples, the 3D representation, including virtual spaces thereof, can be associated with the 2D representation, including virtual spaces thereof, and vice-versa.

Figure 4:
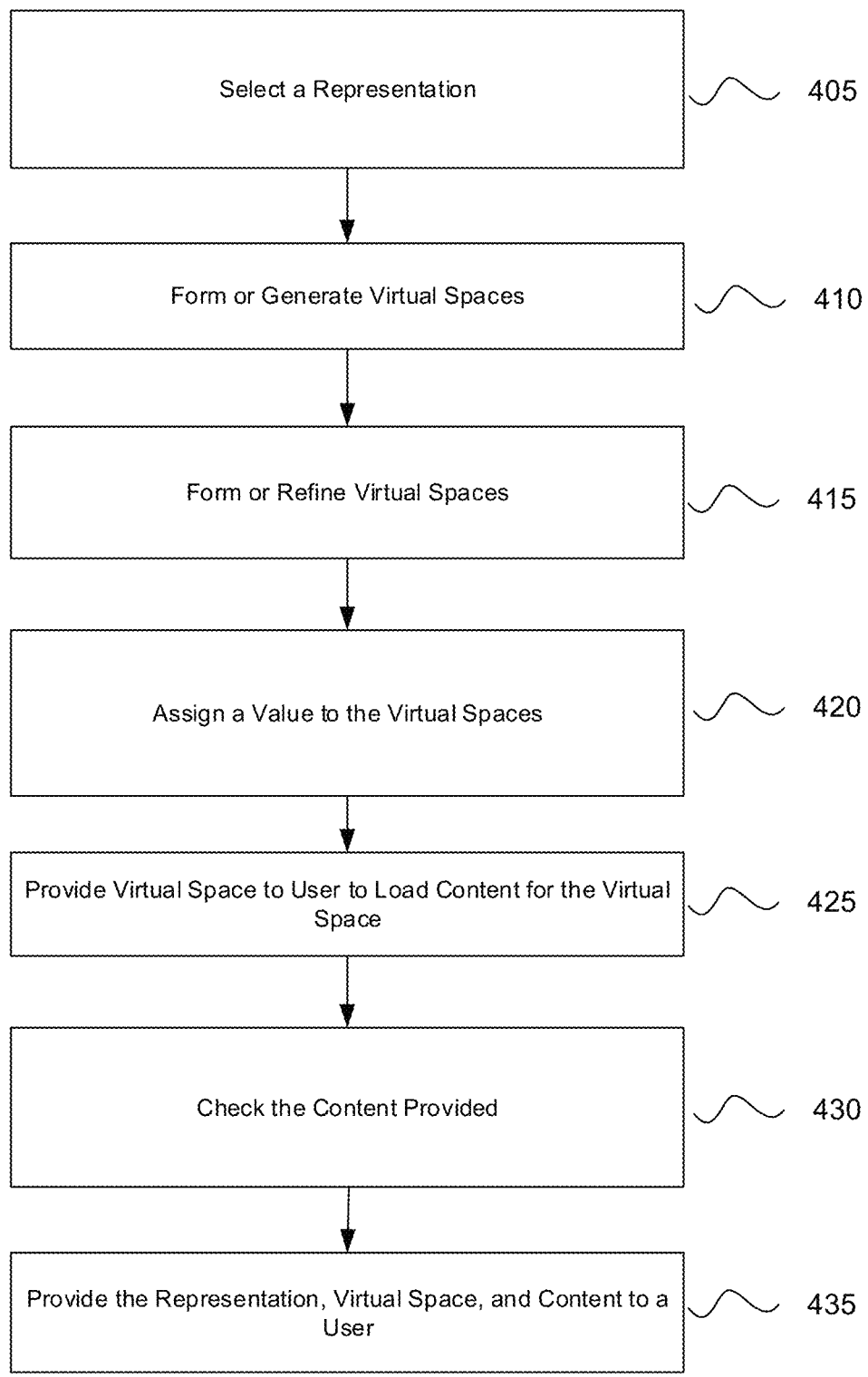
FIG. 4 illustrates an example method according to aspects of the disclosed technology.

FIG. 4 illustrates a flow chart of an example method 400 to identify virtual spaces with any representation which may be displayed to the user. As explained above, any 2D or 3D representation or model which has image information can be analyzed to identify virtual spaces.

At block 405, a representation can be selected. In some examples, 2D and a 3D model can be selected at this step. In other examples, only a portion of a model can be selected. In some examples, the representation can be selected based on a user request related to a particular geographical area. In other examples, a representation can be selected at regular or semi-regular intervals. In other examples, such as areas where a physical topology of an area may change, the representation can be selected at more regular intervals.

At block 410, virtual spaces can be selected, formed, or generated within the model.

In some examples, ICA techniques can be used to identify or find the virtual spaces. Specialized machine learning systems in addition or in lieu of ICA. In other examples, specialized machine learning systems can be specialized, custom designed, or specially trained to identify areas of the 3D model or related imagery as potential areas or candidates of interest in the 3D model. In some examples, techniques used in block 410 may go beyond simply looking for text, logos, or other symbols which may be present within the model or related imagery in forming their predictions. For example, as part of creating a prediction, edges of buildings can be detected. In other examples, a store front can be detected based on imagery, banners, or variations in colors. In some examples, different algorithms can be selected for use depending on the density of buildings or other parameters of the model or representation being analyzed. In yet other examples, spaces which are too "high," at a high angle relative to the ground, not visible to most viewers, of low interest to users, or out of visual sight from a street level can be discarded in this block.

In some examples, one virtual space can be associated with other virtual spaces, such that content associated with one virtual space is also associated with the other virtual spaces associated with that virtual space. In some examples, this relationship between virtual spaces can be useful when a user is panning, moving through, or otherwise interacting with the representation.

At block 415, a human operator can refine the virtual spaces. In some examples, virtual spaces can be presented to a user through an interface, such as for example the interface shown with reference to FIG. 2B. For example, a human user can refine the prediction area of virtual space 246 to better match with the displayed sign. In other examples, a virtual space can be altered or modified by a human operator. For example, the boundaries of the space can be edited. In other examples, one virtual space can be split into two or more virtual spaces. In yet other examples, the continuity of a virtual space as being defined or associated with other virtual spaces can be ensured if the representation is changed by a user. For example, with reference to FIG. 2C, if a user is looking at the "Eat!" sign, but modifies the representation 210 by rotating the representation, the "eat" sign should still be visible in the next perspective view of the user. In another example, with reference to FIG. 2D, if a user is scrolling on a 2D representation, the visibility of certain virtual spaces can be maintained. In some examples, a registration algorithm to align our boxes detected in different images and render them in a way that they would appear the same and continuous. A person of skill in the art will appreciate that various imagery registration algorithms can be used to register and integrate the virtual spaces within a representation. As the location of the virtual space is known within a 2D or 3D model, and the content displayed therein is located in a layer above or is otherwise within the virtual space, the content can be remapped as needed to provide various views to a user. For example, both sparse methods and dense methods of image registration techniques can be used. In some examples, other methods, such as Fourier-Mellin transformation methods can be used.

In some examples, only certain human operators can refine the virtual spaces based on authorization or other rules related to the human operator. For example, only certain human operators can mark certain spaces as identified spaces for training a ML model, mark other spaces as being inappropriate for ML models, or otherwise refine or mark identified spaces as valid or invalid as virtual spaces.

In some examples, a human operator can be based who owns the physical space related to the virtual space. For example, if a business owner has been vetted as owning a physical space, then that same business owner can claim virtual spaces related to that physical space as his or her own, and exclusively provide the content for those spaces. For example, the vetting process can involve a business owner receiving through registered mail or other postal methods a code or other item to verify that the business owner is in control of a particular location. In other examples, some virtual spaces may have no business owner or entity associated with that space. In such examples, any human operator or public user may be able to modify the virtual space. In other examples, if no entity is associated with ownership of the space, the virtual space can be "locked" and no modification can be made to it to refine the boundaries of the virtual space.

At block 420, virtual spaces can be monetized or assigned a value according to a database of rules. In some examples, the virtual spaces can be thought of as digital advertisement spaces, which can be valued. In some examples, the value of the virtual space can be based on user demand, geographical region, tags or other metadata associated with the virtual space, or other information.

In some examples, the "value" of a virtual space can be also based upon additional information related to the viewing of that space by users. For example, it may be possible to observe a number of users who are viewing a particular representation of a geographical area, interacting with a particular virtual space within that representation, track the number of users within a particular area by GPS, cellular signals, or other data, or other information related to a particular virtual area. These inputs can be inserted to generate an algorithm or machine learning model to generate a value for the virtual space.

In some examples, content providers may discover the virtual spaces by a variety of means. The owner or legal owner of the virtual space can be free to set a price for the usage of the virtual space. In some examples, the provider of the map, model, or representation can act as a broker by matching owners or legal owners of a virtual space and content providers who wish to rent or buy the virtual space. In some examples, a database of available listings can be viewable by owners of virtual space and purchasers or renters of the virtual space.

At block 425, virtual space can be provided to a user to load content. For example, the content can be related to a virtual space. In some examples, a user can use an interface, such as the one discussed with reference to FIG. 2B, to upload and view content. In other examples, the content can be viewed by the user in a test environment before the content is made "live" for viewing or uploaded to another computing device. In some examples, the user can be provided with a portion of the content which is already derived or generated during the steps above, such as for example, determination of images, content, or text that already is present in the representation, such as through optical character recognition.

In some examples, the content for the virtual spaces can be "live" content, such as actionable content, which allows for a user to cause actions or steps to be taken based on an interaction with the content. For example, the content may include an interactive menu which can be clicked for a user to order an item or good. In other examples, the virtual space can be updated when a good or product is ready to be picked up based on feedback or input from the owner or user of a virtual space.

At block 430, a database of rules can check the content provided in block 425. In some examples, the database can include checks for trademarks, copyright, or other intellectual property. In other examples, the database can ensure that censored language, symbols, or rules not meeting the business rules of the representation provider are removed. In some examples, the database of rules can provide a notification to the user providing the content that the content is not acceptable and the reason why. In other examples, the content may not be suitable for display and for that reason not integrated into a particular virtual space.

At block 435, the representation and the virtual space displaying content can be provided to a user. Some example representations and views of virtual spaces are discussed with reference to FIGS. 2A-2D and FIG. 3. As explained above, at this block, additional actions can be taken by the user to interact with the virtual space or the content therein, such as viewing a video, clicking for additional information, ordering a good or service, or copying, modifying, or providing additional information related to or from the virtual space. Rules related to the virtual space and representation can determine how the overall "look" and "feel" of the view being displayed will be. For instance, the visual properties of the virtual space can be determined based on the user preferences, type of content being displayed in the virtual space, the size, scope, or shape of the virtual space, the type of device being used to view the content, the overall size, shape, or scope for the content, the size of the viewing device, and other parameters.

With reference to method 400, the ICA or machine learning tools used to identify virtual spaces can be first trained during an initial training phase. In some examples, ICA or other image classification techniques can be used to first identify spaces which are more likely candidates for virtual spaces, such as lettering, symbols, numbers, signs, billboards, or other markers. Thereafter, other machine learning techniques can be used after ICA analysis has been performed. In other examples, ICA or other image classification techniques can first be used to identify spaces which are likely candidates for virtual spaces. These spaces can be provided to human users to manually identify virtual spaces in order to create training data for machine learning systems.

The initial training or input data of a machine learning model can be done on a set of "golden data" with human operators who can identify suitable virtual spaces, such as, for example, "advertisable" or "display" areas including billboards, storefronts, parking lots, empty building space, rooftops, signs, or empty windows. In some examples, the human operators can also identify portions of an image which are not suitable to be virtual spaces. In other examples, portions of an image which are identified as a particular object which is deemed to not be suitable for a virtual space can be marked as such or identified in a database as objects which are not suitable for virtual spaces. For example, a tree, lamppost, sidewalk, window, window frame, or other object may be programmed as being unsuitable. In some examples, a human operator can identify such objects and tag them as such, while also marking them as unsuitable for use as virtual spaces.

In some examples, polygonal regions projected onto a facade of a visible building or structure can be a virtual space. In street-level maps, the virtual space can be a polygonal region which can be represented in pixel coordinates on the image. In some examples, adjustment of the virtual space may be required when transferring the provided virtual space into another imagery to account for the pose, location, or direction of the camera changes when changing from one street-level or other view of a structure to another view. In other examples, the region marked as a virtual space may be represented as a section of a facade or other characteristic in 3D world coordinates, such as for example, ECEF, and the imagery pixel coordinates can be derived from the 3D box or polygonal based on the particular image's pose. Similarly, in aerial or other imagery that is "top-down" or in a map, the virtual space can be a polygonal region that corresponds to a building, a section of a building or other structure, public or private grounds, or a section of the public or private ground.

In some examples, initial training can be done on the data discussed above to train a machine learning model or a specific machine learning instance. In some examples, the machine learning model can take as input the data above and provide as an output polygonal regions representing specific virtual space instances. In other examples, the output of the machine learning model can be semantic segmentation, wherein a semantic value, such as "yes" or "no" is assigned to each pixel within an image as belonging to a virtual space, not belonging to a virtual space, or belonging to or being part of a particular address, location, building, or structure. In some examples, the semantic output can be refined if a user were to claim the virtual spaces associated with his or her address or business location, and could refine the provided virtual spaces within the semantic segmentation such as by changing the bounds or dimensions of a virtual space to correspond to particular objects of interest, desired size of a virtual space, or other characteristic of a virtual space. Thus, by changing the bounds, a user is changing the pixel's semantic value, which is information that can itself be used to train or retrain a machine learning model.

In some examples, based on additional data related to the image being analyzed, such as the location, type of information, or legal requirements, specific locations may not be analyzed or included in either machine learning training or machine learning outputs, such as restricted areas. For example, non-commercial public lands or buildings, national parks, military locations, police locations, local government buildings could be excluded from both the data training set or the data analysis output.

As the initial training data may not be adequately representable of all types of use cases and types of data, in some examples, continuous or subsequent re-training of the tools can occur from real vetted data gathered from real owners and moderation results. In other examples, additional machine learning tools can be used to generate or identify additional types of surfaces not originally identified in the initial training through generalization of spaces using machine learning models. These generalized predictions can be further refined through real vetted data, allowing the machine learning model to identify which types of spaces to identify. In other examples, the machine learning tools can use additional "meta" information, such as location, density, other buildings, surfaces identified in the locality, color of buildings, age of buildings, or known characteristics to further optimize or enhance the identification of virtual spaces. Retraining or updating of machine learning models or tools can occur when additional high confidence information is added, certain virtual spaces are marked or used by end users, or feedback, positive or negative, is received in connection with certain virtual spaces by users.

After the initial training is performed, the ML models or tools can receive one or more images to analyze. The ML tools can provide as an output subsets of those images which are virtual spaces corresponding to a characteristic of a physical or real world environment. For example, in some examples, a confidence interval or confidence metric may be provided responsive along with a specific virtual space. In some examples, the output of a ML model or tool can be a set of coordinates, pixels, or portions of an image, whether 2D or 3D, which can identify a virtual space.

In some examples, potential virtual spaces identified by the ML model can be aggregated across various images or views. For example, a particular location may have multiple views or images related to that space which have been taken at various times of day, various angles, or with different fields of views. As metadata or other information about the images may be known and virtual spaces may be identified on one or more of those images by ICA and/or machine learning models, the ML model can also aggregate or combine predictions from multiple images of one location to more robustly identify a virtual space or increase the probability that a particular space is suitable to be marked as a virtual space.

Example Machine Learning, Statistical, Probabilistic, and Selection Methods

In some examples, probabilistic methods can be used. For example, a Gaussian mixture model can be used. Gaussian mixture models are a probabilistic model for representing normally distributed subpopulations within an overall population. In a Gaussian mixture model, it is not required that an observed set of data should characterize or state which subpopulation a particular observation within the distribution belongs to.

Example machine learning techniques which can be used include the following.

In some examples, a mix of supervised learning techniques and unsupervised learning techniques can be used. In some examples, machine vision methods and techniques can be used for identification of virtual spaces.

In some examples, generative adversarial networks can be used to predict or detect network anomalies Generative adversarial networks use two networks, one adversarial and one generative, in an attempt to fool the adversarial network by objects generated by the generative network.

In some examples, clustering methods can be used to cluster inputs, network parameters, trained models, or virtual machines. Clustering methods can be used in real time to classify and match models or groups of models with virtual machines or groups of virtual machines. Clustering can be an unsupervised machine learning technique in which the algorithm can define the output. One example clustering method is "K_Means" where K represents the number of clusters that the user can choose to create. Various techniques exist for choosing the value of K, such as for example, the elbow method.

Some other examples of techniques include dimensionality reduction. Dimensionality reduction can be used to remove the amount of information which is least impactful or statistically least significant. In networks, where a large amount of data is generated, and many types of data can be observed, dimensionality reduction can be used in conjunction with any of the techniques described herein. One example dimensionality reduction method is principle component analysis (PCA). PCA can be used to reduce the dimensions or number of variables of a "space" by finding new vectors which can maximize the linear variation of the data. PCA allows the amount of information lost to also be observed and for adjustments in the new vectors chosen to be made. Another example technique is t-Stochastic Neighbor Embedding (t-SNE).

Ensemble methods can be used, which primarily use the idea of combining several predictive models, which can be supervised ML or unsupervised ML to get higher quality predictions than each of the models could provide on their own. As one example, random forest algorithms Neural networks and deep learning techniques can also be used for the techniques described above. Neural networks generally attempt to replicate the behavior of biological brains in turning connections between an input and output "on" or "off" in an attempt to maximize a chosen objective.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method comprising:
   receiving one or more static images of a real world environment;
   generating a representation image based on the one or more static images received using an image content analysis machine learning model trained on two-dimensional or three-dimensional models of physical locations other than the real world environment;
   outputting, by the image content analysis machine learning model, a plurality of virtual spaces, wherein each virtual space is based upon at least a characteristic of the representation image;
   selecting a subset of the plurality of virtual spaces for addition to the representation image based on one or more predetermined rules regulating an amount of content to be displayed in the representation image;

providing, to a first user, an interface for uploading content for display in the subset of virtual spaces;

receiving, from the first user, the content for display at the subset of virtual spaces added as an overlay to the representation image;

displaying, to a second user, the representation image with the content for display at the subset of virtual spaces, wherein the content comprises one or more interactive objects based on the at least a characteristic of the representation image; and displaying, to the second user, additional information based on the one or more interactive objects when the one or more interactive objects are selected, wherein the additional information includes annotations the first user created.

2. The method of claim 1, wherein the characteristic is one of relative visibility, viewshed, prominence of a space, elevation, unused physical space, proximity to a marker, a storefront, or the presence of signage.

3. The method of claim 1, wherein outputting the plurality of virtual spaces comprises outputting a respective confidence metric for each of the plurality of virtual spaces, and wherein, for a given virtual space having a confidence metric below a predetermined threshold, before including the given virtual space in the interface for uploading, outputting the given virtual space for manual verification.

4. The method of claim 1, further comprising receiving, from one or more editing users, an updated set of boundaries of at least one of the plurality of virtual spaces.

5. The method of claim 1, wherein the content received from the first user is interactive.

6. The method of claim 5, wherein the content is further configured to send a notification to the second user uploading the content upon receiving an input on the provided interactive content.

7. The method of claim 1, further comprising verifying the first user as an owner of a physical space associated with respective ones of the one or more of the subset of virtual spaces.

8. The method of claim 1, wherein the one or more predetermined rules include at least one of:
(a) a threshold number of virtual spaces within a predetermined distance along a road of the real world environment; or
(b) a threshold number of virtual spaces associated with each image of the one or more static images.

9. A system comprising one or more processors configured to:
receive one or more static images of a real world environment;
generate a representation image based on the one or more static images received using an image content analysis machine learning model trained on two-dimensional or three-dimensional models of physical locations other than the real world environment;
output, by the image content analysis machine learning model, one or more virtual spaces, wherein each virtual space is based upon at least a characteristic of the representation image;

select a subset of the plurality of virtual spaces for addition to the representation image based on one or more predetermined rules regulating an amount of content to be displayed in the representation image;

provide, to a first user, an interface for uploading content for display in the subset of virtual spaces;

receive, from the first user, the content for display at the subset of virtual spaces added as an overlay to the representation image;

display, to the second user, the representation image with the content for display at the subset of virtual spaces, wherein the content comprises one or more interactive objects based on the at least a characteristic of the representation image; and displaying, to the second user, additional information based on the one or more interactive objects when the one or more interactive objects are selected, wherein the additional information includes annotations the first user created.

10. The system of claim 9, wherein the characteristic is one of relative visibility, viewshed, prominence of a space, elevation, unused physical space, proximity to a marker, a storefront, or the presence of signage.

11. The system of claim 9, wherein the one or more processors are configured to:
output a respective confidence metric for each virtual space; and
for a given virtual space having a confidence metric below a predetermined threshold, before including the given virtual space in the interface for uploading, output the given virtual space for manual verification.

12. The system of claim 9, further comprising configuring at least one of the subset of virtual spaces to be editable by the first user.

13. The system of claim 9, wherein the content received from the first user is interactive.

14. The system of claim 9, wherein the content is further configured to send a notification to the second user uploading the content upon receiving an input on the provided interactive content.

15. The system of claim 9, wherein the one or more processors are configured to verify the first user as an owner of a physical space associated with respective ones of the subset of virtual spaces.

16. The system of claim 9, wherein the machine learning algorithm is configured to reject any of the plurality of virtual spaces for which a characteristic of the rejected virtual space is under or over a predefined parameter.

17. The system of claim 9, wherein the one or more predetermined rules include at least one of:
(a) a threshold number of virtual spaces within a predetermined distance along a road of the real world environment; or
(b) a threshold number of virtual spaces associated with each image of the one or more static images.

* * * * *